B. S. BOWERS.
COMBINED AIR GAGE AND MAGNET TESTER.
APPLICATION FILED JUNE 4, 1917.

1,251,745.

Patented Jan. 1, 1918.

Witness
G. T. Baker

Inventor
Benjamin S. Bowers
By Byrnes Townsend & Brickenstein
Attorneys

UNITED STATES PATENT OFFICE.

BENJAMIN S. BOWERS, OF GRAND RAPIDS, MINNESOTA.

COMBINED AIR-GAGE AND MAGNET-TESTER.

1,251,745.  Specification of Letters Patent.  Patented Jan. 1, 1918.

Application filed June 4, 1917.  Serial No. 173,323.

*To all whom it may concern:*

Be it known that I, BENJAMIN S. BOWERS, a citizen of the United States of America, residing at Grand Rapids, in the county of Itasca and State of Minnesota, have invented certain new and useful Improvements in Combined Air-Gages and Magnet-Testers, of which the following is a specification.

The object of the present invention is to combine in a single mechanism a device for ascertaining the pressure within a pneumatic tire and a device for testing the strength of permanent magnets.

The magnets used in ignition systems for automobiles comprise a plurality of permanent magnets to furnish the magnetic field. It is a matter of common occurrence that one of the plurality often loses its magnetism and thereby affects the operation of the magneto. The automobile owner has no means of determining which of the magnets is at fault and is compelled to take his machine to the repair shop. Even in the repair shop there is usually no device for singling out the defective magnet. The result is that the good magnets will be discarded together with the single bad one and the owner has to carry the total loss and the expenses of repairing, while it would be an easy and inexpensive matter to remedy the fault, if the owner had some reliable means for testing the magnets.

It is the object of my invention to provide a magnet tester in a very convenient form with only a nominal expense in addition to the cost of the usual air gage.

For a fuller understanding of my invention reference is had to the appended drawings in which:—

Figure 1:
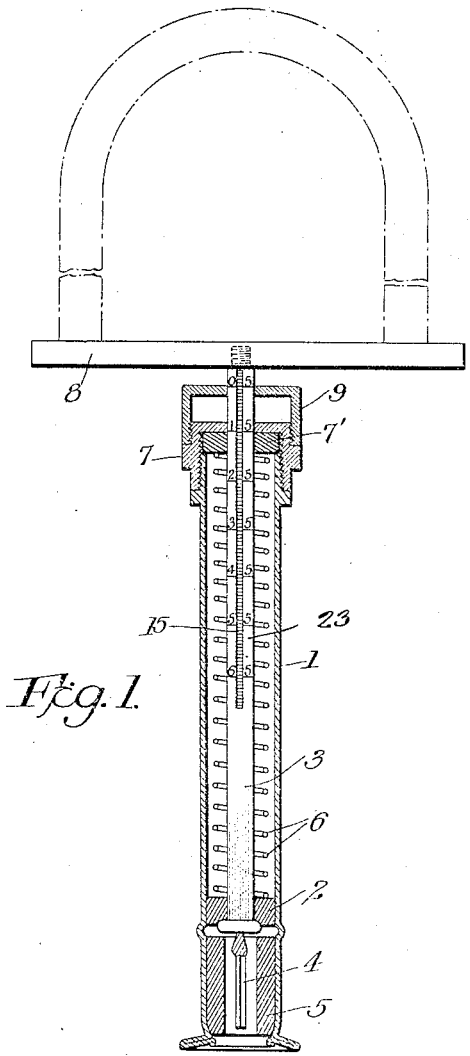
Figure 1 is a longitudinal central section of my device in normal position.
Figure 2:
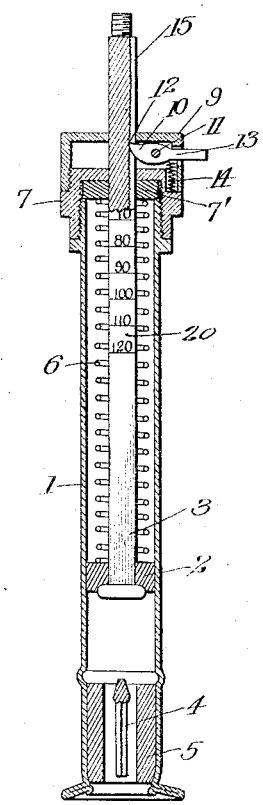
Fig. 2 is a longitudinal central section taken at right angle to the section shown in Fig. 1.
Figure 3:
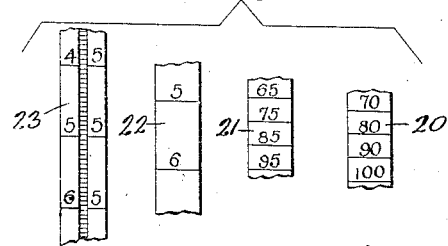
Fig. 3 is a fragmentary view of the scales.

1 represents a tubular casing or barrel of ordinary construction, 2 the piston, 3 the piston rod, 4 the anvil, 5 the rubber gasket washer and 6 the spring, all of which may be of any preferred form of construction. The piston rod which is preferably of angular cross-section, is of such length as to normally project slightly beyond the end of the barrel.

A cap 7 is screw-threaded on the end of the barrel and between the said cap and the end of the barrel is placed the ring packing 7'. The rod 3 is provided at its free end with screw threads to be received in a screw-threaded aperture of a soft iron armature 8. When the armature is placed across the ends of an electromagnet it is attracted and the force necessary to pull it off is a measure of the magnetic strength of the magnet. The spring is so designed as to conveniently measure the usual air pressures of tires. In order to coördinate the strength of this spring with the forces dealt with in measuring magnets I so choose the width and thickness of the armature that the pull required to detach it from a magnet having maximum strength will be nearly that required to draw the piston out its full length. Thereby, although the air pressure per inch is many times that of the magnetic pull per inch, the device may be used to the full extent of its capacity for both purposes and the graduations may be distributed over substantially the full length of the piston.

It is advisable, when a measurement is made, to lock the piston against return movement, so that the indications can be conveniently read off the scale. This is especially desirable for testing the strength of magnets because the armature becomes detached suddenly and the instrument is carried away from the magnet with such speed that it is well nigh impossible to get a correct reading. To facilitate the reading of the scale I have provided means for locking the piston in its drawn out position.

Over the cap 7 is screwed a second cap 9 which forms a housing for a cam or detent 10. This detent is pivoted on pivot 11 to the casing, is slightly eccentric and terminates in a sharp edge 12. On the side of the pivot opposite the edge 12 the cam is extended to form an arm 13. To one side of the arm in the plane of rotation I provide spring means 14 for constantly urging the edge 12 into engagement with the piston so that upon the slightest retrograde movement of the piston the edge 12 will be forced into the metal and lock the piston. When the cam is properly designed the locking action will be automatic and instantaneous. The extension is long enough to provide a handle to be operated by the finger for disengaging the cam after the action of the spring is first approximately neutralized by hand.

I preferably groove one face of the piston to receive the detent. The bottom of the groove 15 may be roughened or serrated to augment the locking action. The piston and detent may be made of special hard steel, such as tool steel, so as to reduce the wear.

While I have shown only one form of locking mechanism, it is obvious that other means may be devised for performing the same function.

In order to indicate the air pressures and magnetic forces I have made the piston of rectangular cross-section and have placed a scale on each face. On one face I have marked a scale 20, indicating air pressures in even units of 10 pounds while on the opposite face I have marked a scale 21 indicating similar units differing from the former by 5 pounds. The two remaining faces 22 and 23 are similarly marked to indicate magnetic forces in even pounds and intermediate values respectively.

For conveniently storing the device I may detach the armature.

It is thus apparent that I have by proper coördination of the various parts provided two devices in one, adapted for use in the same line of work, thereby adding a useful tool to the mechanic's chest without any material expense.

It is understood that my invention may be embodied in various forms. It is possible to adapt, by suitably changing various details, existing forms of air gages to operate for the purpose specified.

What I claim is:

1. A combined air gage and magnet tester comprising a frame member, a movable element in the frame member, resilient means for restraining the movement of the movable element in one direction, means for admitting fluid pressure to act on one end of the movable element against the action of the resilient means and a magnetic armature connected with the movable element to act on the opposite end thereof.

2. A combined air gage and magnet tester comprising a frame member, a movable element in the frame member, resilient means for restraining the movement of the movable element in one direction, means for admitting fluid pressure to act on one end of the movable element against the action of the resilient means, a magnetic armature connected with the movable element to act on the opposite end thereof and scales for separately indicating the force applied at either of the opposite ends of the movable element to move it.

3. A device for testing the air pressure of tires and the strength of horse-shoe magnets comprising a frame member, movable means in the frame member, resilient means for restraining the movement of the movable means, means for admitting fluid pressure to act on one end of the movable means against the action of the resilient means and an iron bar connected with the movable means to act on the opposite end thereof.

4. A device for testing the air pressure of tires and the strength of horse-shoe magnets comprising a frame member, movable means in the frame member, resilient means for restraining the movement of the movable means, means for admitting fluid pressure to act on one end of the movable means against the action of the resilient means, an iron bar connected with the movable means to act on the opposite end thereof and scales for separately indicating the force applied at either of the opposite ends of the movable element to move it.

5. A combined air gage and magnet tester comprising a frame member, a movable element in the frame member, resilient means for restraining the movement of the movable element in one direction, means for admitting fluid pressure to act on one end of the movable element against the action of the resilient means, a magnetic armature connected with the movable element to act on the opposite end thereof, means for temporarily locking the movable means against return movement after it has been moved and scales for separately indicating the force applied to either side of the movable element to move it.

In testimony whereof, I affix my signature in presence of two witnesses.

BENJAMIN S. BOWERS.

Witnesses:
  WILLIAM C. GILBERT,
  THOMAS RUSSELL.